United States Patent
Collobert et al.

(10) Patent No.: US 7,778,949 B2
(45) Date of Patent: Aug. 17, 2010

(54) METHOD AND APPARATUS FOR TRANSDUCTIVE SUPPORT VECTOR MACHINES

(75) Inventors: Ronan Collobert, Princeton, NJ (US); Jason Weston, New York, NY (US); Leon Bottou, Princeton, NJ (US)

(73) Assignee: NEC Laboratories America, Inc., Princeton, NJ (US)

( * ) Notice: Subject to any disclaimer, the term of this patent is extended or adjusted under 35 U.S.C. 154(b) by 462 days.

(21) Appl. No.: 11/688,928

(22) Filed: Mar. 21, 2007

(65) Prior Publication Data
US 2007/0265991 A1  Nov. 15, 2007

Related U.S. Application Data

(60) Provisional application No. 60/747,225, filed on May 15, 2006.

(51) Int. Cl.
*G06F 17/00* (2006.01)
(52) U.S. Cl. ........................................... 706/45
(58) Field of Classification Search ................ 706/15, 706/45
See application file for complete search history.

(56) References Cited

U.S. PATENT DOCUMENTS

| | | | |
|---|---|---|---|
| 6,941,301 B2 | 9/2005 | Ferguson et al. |
| 6,944,616 B2 | 9/2005 | Ferguson et al. |
| 7,020,642 B2 | 3/2006 | Ferguson et al. |
| 7,054,847 B2 | 5/2006 | Hartman et al. |
| 7,174,040 B2 | 2/2007 | Lienhart et al. |
| 2004/0111453 A1 | 6/2004 | Harris et al. |
| 2005/0049985 A1 | 3/2005 | Mangasarian et al. |
| 2005/0049990 A1 | 3/2005 | Milenova et al. |
| 2005/0131847 A1 | 6/2005 | Weston et al. |
| 2007/0011110 A1 | 1/2007 | Selvaraj et al. |

OTHER PUBLICATIONS

Smola et al. Kernel Methods for Missing Variables. Tenth International Workshop on Artificial Intelligence and Statistics. Jan. 2005.*
Krause et al. Leveraging the Margin More Carefully. Proceedings of the 21 st International Conference on Machine Learning, Banff, Canada, 2004.*
Collobert. Large Scale Transductive SVMs. Journal of Machine Learning Research. Aug. 2006.*
Bennett, K. et al., "Semi-supervised Support Vector Machines", Advances in Neural Information Processing Systems 12, pp. 368-374, MIT Press, Cambridge, MA 2004 .

(Continued)

*Primary Examiner*—Donald Sparks
*Assistant Examiner*—David H Kim
(74) *Attorney, Agent, or Firm*—Paul Schwarz; Joseph J. Kolodka (57) ABSTRACT

Disclosed is a method for training a transductive support vector machine. The support vector machine is trained based on labeled training data and unlabeled test data. A non-convex objective function which optimizes a hyperplane classifier for classifying the unlabeled test data is decomposed into a convex function and a concave function. A local approximation of the concave function at a hyperplane is calculated, and the approximation of the concave function is combined with the convex function such that the result is a convex problem. The convex problem is then solved to determine an updated hyperplane. This method is performed iteratively until the solution converges.

25 Claims, 7 Drawing Sheets

OTHER PUBLICATIONS

Bie, T. et al., "Convex Methods for Transduction", Advances in Neutral Information Processing Systems 16, MIT Press, Cambridge, MA, 2004.

Burges, C., "A Tutorial on Support Vector Machines for Pattern Recognition", Data Mining and Knowledge Discovery 2, pp. 121-167, 1998.

Chapelle, O. et al., "Semi-Supervised Classification by Low Density Separation", In Proceedings of the Tenth International Workshop on Artificial Intelligence and Statistics, 2005.

Fung, G. et al., "Semi-Supervised Support Vector Machines for Unlabeled Data Classification", in Optimisation Methods and Software, pp. 1-14, Boston, 2001.

Joachims, T., "Transductive Interference for Text Classification Using Support Vector Machines", in International Conference on Machine Learning, ICL, 1999.

Platt, J.C., "Fast Training of Support Vector Machines Using Sequential Minimal Optimization", Advances in Kernel Methods, MIT Press, 1999.

Yuille, A.L. et al., "The Concave-Convex Procedure (CCCP)", Advances in Neutral Information Processing Systems, MIT Press, Cambridge, MA 2002.

* cited by examiner

850 —— Initialize $\theta^0 = (w^0, b^0)$ with a standard SVM solution on the labeled points.

852 —— Compute $\beta_i^0 = \begin{cases} C^* & \text{if } y_i f_{\theta^0}(x_i) < s \text{ and } i \geq L+1 \\ 0 & \text{otherwise} \end{cases}$ Set $\zeta_i = y_i$ for $1 \leq i \leq L+2U$ and $\zeta_0 = \frac{1}{L}\sum_{i=1}^{L} y_i$ repeat 854 — • Solve the following convex problem ( with $K_{ij} = \Phi(x_i) \cdot \Phi(x_j)$ )

$$\max_{\alpha} \left( \alpha \cdot \zeta - \frac{1}{2} \alpha^T K \alpha \right) \text{ subject to } \begin{cases} \alpha \cdot 1 = 0 \\ 0 \leq y_i \alpha_i \leq C \quad \forall 1 \leq i \leq L \\ -\beta_i \leq y_i \alpha_i \leq C^* - \beta_i \quad \forall i \geq L+1 \end{cases}$$

856 —— • Define $w^{t+1} = \sum_{i=0}^{L+2U} \alpha_i \Phi(x_i)$.

858 — • Compute $b^{t+1}$ using

$$0 < y_i \alpha_i < C \implies y_i(w^{t+1} \cdot \Phi(x_i) + b^{t+1}) = 1 \quad \forall 1 \leq i \leq L$$

$$-\beta_i < y_i \alpha_i < C^* - \beta_i \implies y_i(w^{t+1} \cdot \Phi(x_i) + b^{t+1}) = 1 \quad \forall i \geq L+1$$

860 —— • Compute $\beta_i^{t+1} = \begin{cases} C^* & \text{if } y_i f_{\theta^{t+1}}(x_i) < s \text{ and } i \geq L+1 \\ 0 & \text{otherwise} \end{cases}$ 862 —— until $\beta^{t+1} = \beta^t$

METHOD AND APPARATUS FOR TRANSDUCTIVE SUPPORT VECTOR MACHINES

This application claims the benefit of U.S. Provisional Application No. 60/747,225 filed May 15, 2006, the disclosure of which is herein incorporated by reference.

BACKGROUND OF THE INVENTION

The present invention relates generally to machine learning, and more particularly to transductive support vector machines.

Machine learning involves techniques to allow computers to "learn". More specifically, machine learning involves training a computer system to perform some task, rather than directly programming the system to perform the task. The system observes some data and automatically determines some structure of the data for use at a later time when processing unknown data.

Machine learning techniques generally create a function from training data. The training data consists of pairs of input objects (typically vectors), and desired outputs. The output of the function can be a continuous value (called regression), or can predict a class label of the input object (called classification). The task of the learning machine is to predict the value of the function for any valid input object after having seen only a small number of training examples (i.e. pairs of input and target output).

One particular type of learning machine is a support vector machine (SVM). SVMs are well known in the art, for example as described in V. Vapnik, *Statistical Learning Theory*, Wiley, New York, 1998; and C. Burges, A Tutorial on Support Vector Machines for Pattern Recognition, Data Mining and Knowledge Discovery 2, 121-167, 1998. Although well known, a brief description of SVMs will be given here in order to aid in the following description of the present invention.

Figure 1:
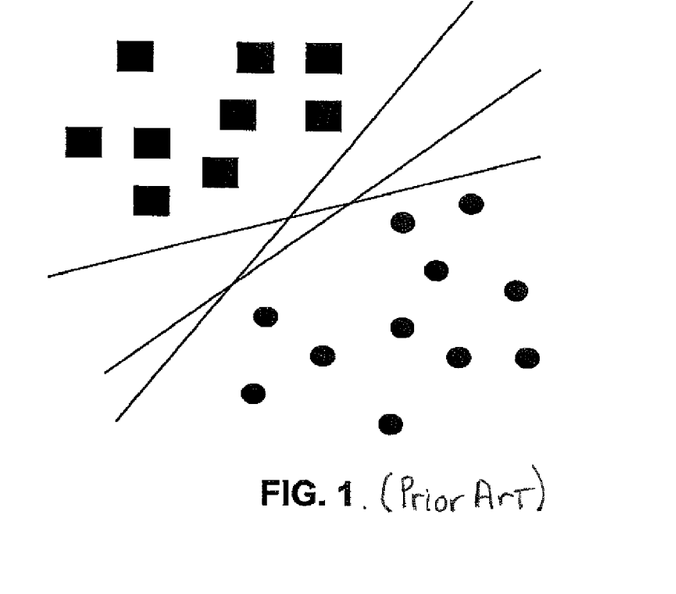
FIG. 1 shows a 2-class data set.
Figure 2:
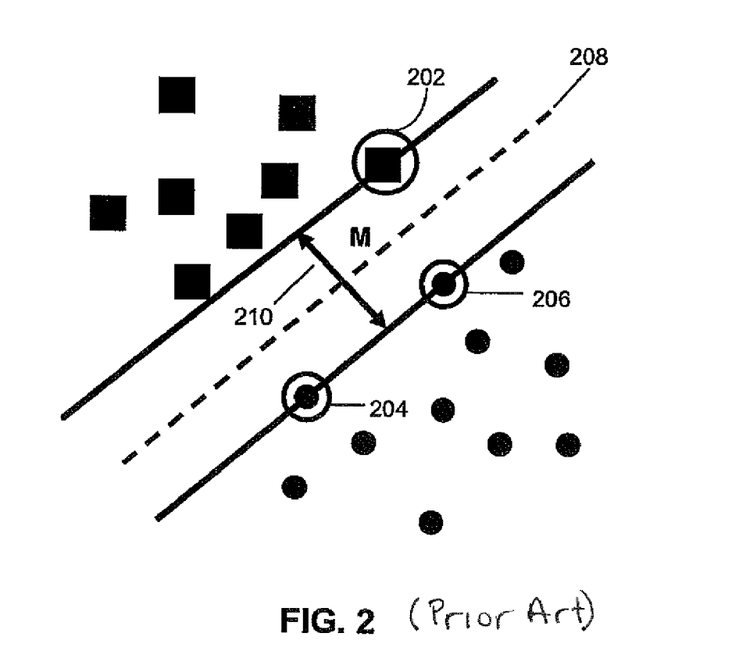
FIG. 2 shows a 2-class data set classified using a maximum-margin hyperplane defined by support vectors.

Consider the classification shown in FIG. 1 which shows data labeled into two classes represented by circles and squares. The question becomes, what is the best way of dividing the two classes? An SVM creates a maximum-margin hyperplane defined by support vectors as shown in FIG. 2. The support vectors are shown as 202, 204 and 206 and they define those input vectors of the training data which are used as classification boundaries to define the hyperplane 208. The goal in defining a hyperplane in a classification problem is to maximize the margin (m) 210 which is the distance between the support vectors of each different class. In other words, the maximum-margin hyperplane splits the training examples such that the distance from the closest support vectors is maximized. The support vectors are determined by solving a quadratic programming (QP) optimization problem. There exist several well known QP algorithms for use with SVMs, for example as described in R. Fletcher, *Practical Methods of Optimization*, Wiley, New York, 2001; M. S. Bazaraa, H. D. Shrali and C. M. Shetty, *Nonlinear Programming: Theory and Algorithms*, Wiley Interscience, New York, 1993; and J. C. Platt, "Fast Training of Support Vector machines using Sequential Minimal Optimization", *Advances in Kernel Methods*, MIT press, 1999. Only a small subset of the of the training data vectors (i.e., the support vectors) need to be considered in order to determine the optimal hyperplane. Thus, the problem of defining the support vectors may also be considered a filtering problem. More particularly, the job of the SVM during the training phase is to filter out the training data vectors which are not support vectors.

Figure 3:
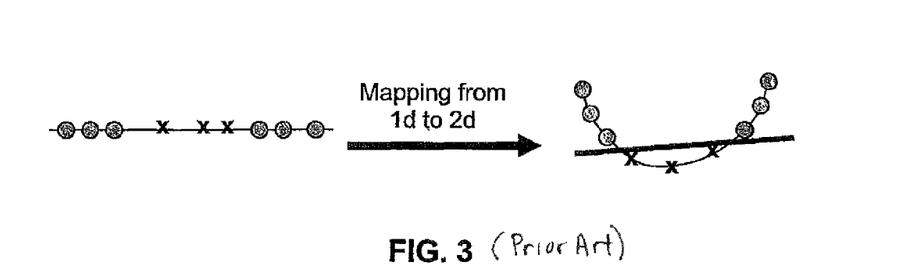
FIGS. 3 and 4 illustrate mapping lower dimensional data into higher dimensional space so that the data becomes linearly separable.
Figure 4:
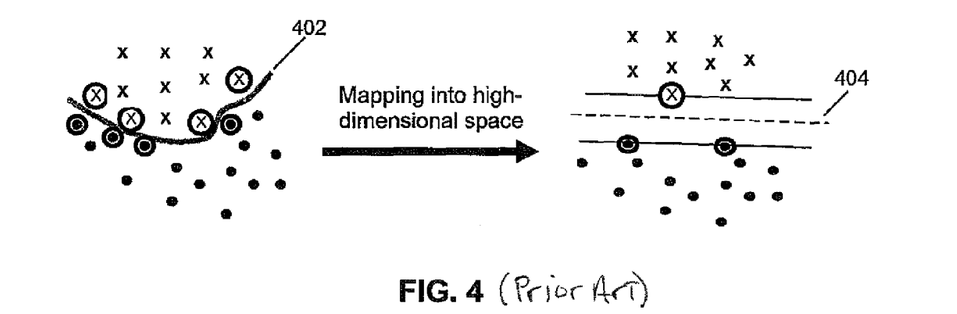

As can be seen from FIG. 2, the optimal hyperplane 208 is linear, which assumes that the data to be classified is linearly separable. However, this is not always the case. For example, consider FIG. 3 in which the data is classified into two sets (X and O). As shown on the left side of the figure, in one dimensional space the two classes are not linearly separable. However, by mapping the one dimensional data into 2 dimensional space as shown on the right side of the figure, the data becomes linearly separable by line 302. This same idea is shown in FIG. 4, which, on the left side of the figure, shows two dimensional data with the classification boundaries defined by support vectors (shown as disks with outlines around them). However, the class divider 402 is a curve, not a line, and the two dimensional data are not linearly separable. However, by mapping the two dimensional data into higher dimensional space as shown on the right side of FIG. 4, the data becomes linearly separable by hyperplane 404. The mapping function that calculates dot products between vectors in the space of higher dimensionality is called a kernel and is generally referred to herein as k. The use of the kernel function to map data from a lower to a higher dimensionality is well known in the art, for example as described in V. Vapnik, *Statistical Learning Theory*, Wiley, New York, 1998.

Figure 5:
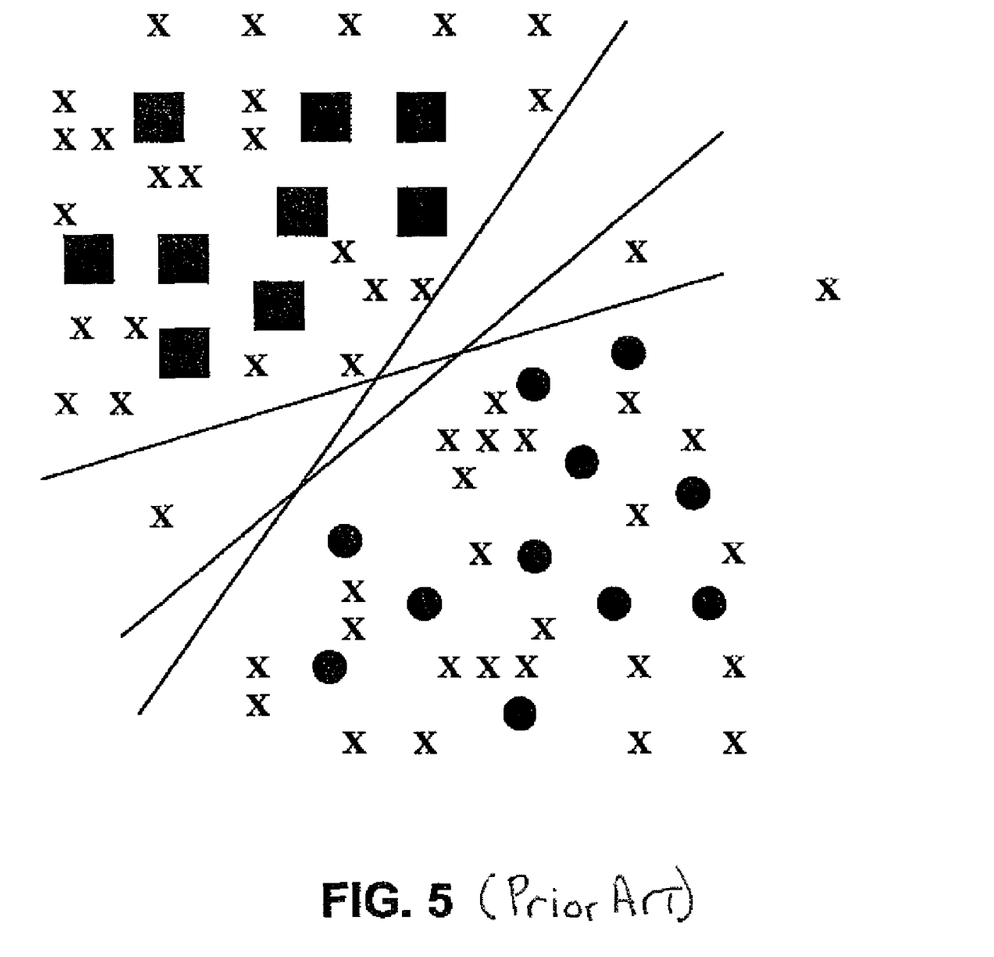
FIG. 5 shows a 2-class data set including unlabeled data.

Transductive support vector machines (TSVMs) are learning machines which improve the generalization accuracy of SVMs by using unlabeled data in addition to labeled data. Consider the data shown in FIG. 5 which shows labeled data labeled as a circle or a square, and unlabeled data which is represented as 'X'. The class of the unlabeled data is unknown and could be either of the classes (circle or square). TSVMs, like SVMs, create a large margin hyperplane classifier using the labeled training data, but simultaneously force the hyperplane to be as far away from the unlabeled data as possible. TSVMs can give considerable improvement over SVMs in situations in which the number of labeled points of the training data is small and the number of unlabeled points is large.

However, conventional implementations of TSVMs often suffer from an inability to efficiently deal with a large number of unlabeled examples. The first implementation of TSVM, described in K. Bennett and A. Demiriz, "Semi-Supervised Support Vector Machines", *Advances in Neural Information Processing Systems* 12, pages 368-374, MIT Press, Cambridge, Mass., 1998, uses an integer programming method, which is intractable for large problems. A combinatorial approach, known as SVMLight TSVM, is described in T. Joachims, "Transductive Inference for Text Classification Using Support Vector Machines", *International Conference on Machine Learning*, ICML, 1999, and is practical for no more than a few thousand examples. A sequential optimization procedure, described in G. Fung and O. Mangasarian, "Semi-Supervised Support Vector Machines for Unlabeled Data Classification", *Optimisation Methods and Software*, pages 1-14, Kluwer Academic Publishers, Boston, 2001, could potentially scale well, although their largest experiment used only 1000 examples. However, this sequential optimization procedure was for linear cases only, and used a special SVM with a 1-norm regularizer to retain linearity. A primal method, described in O. Chapelle and A. Zien, "Semi-Supervised Classification by Low Density Separation", *Proceedings of the Tenth International Workshop on Artificial Intelligence and Statistics*, 2005, shows improved generalization performance over previous approaches, but still scales as $(L+U)^3$, where L and U are the numbers of labeled and unlabeled examples, respectively. This method also stores the entire $(L+U)\times(L+U)$ kernel matrix in memory.

Although TSVMs are powerful regression and classification tools, they suffer from the inability to efficiently deal with a large number of unlabeled examples. What is needed is a technique which improves TSVM performance and scales well, even in view of a large amount of unlabeled data.

BRIEF SUMMARY OF THE INVENTION

The present invention provides a method and apparatus for training a transductive support vector machine (TSVM). In accordance with the principles of the present invention, a non-convex TSVM objective function for determining an optimal hyperplane based on labeled training data and unlabeled test data is decomposed into a convex function and a concave function. The convex and concave functions are approximated iteratively to determine a hyperplane classifier. The non-convex objective function can be decomposed by decomposing a loss function for the unlabeled data. Embodiments of the present invention utilize a loss function for the unlabeled data that is achieved by duplicating all of the unlabeled data in order to associate a cost of classifying the unlabeled data in either class. This minimizes the unlabeled data in the margin of the hyperplane.

In one embodiment of the invention, an initial hyperplane is determined using only the labeled data. A local approximation of the concave function derived from the TSVM objective function is determined at the hyperplane. The local approximation of the concave function is combined with the convex function such that the combination forms a convex problem. This convex problem is solved in order to determine and updated hyperplane. These steps are repeated until the solution converges. It is also possible to introduce a balancing constraint which ensures that a ratio between unlabeled data classified into first and second classes by the hyperplane classifier is similar to a ratio between labeled data classified into first and second classes.

These and other advantages of the invention will be apparent to those of ordinary skill in the art by reference to the following detailed description and the accompanying drawings.

DETAILED DESCRIPTION

The principles of the present invention will be discussed herein in the context of a transductive support vector machine (SVM) algorithm solved in dual formulation with an emphasis on two-class classification problems. One skilled in the art will recognize that the principles of the present invention may be applied to alternative problems, such as regression or multi-class classification, in a similar manner. The transduction methods described herein allow for large scale training with high dimensionality and number of examples.

Consider a set of L labeled training pairs $\mathcal{L}=\{(x_1,y_1), \ldots, (x_L,y_L)\}$, $x \in \mathfrak{R}^n$, $y \in \{1,-1\}$ and an unlabeled set of U test vectors $\mathcal{U}=\{x_{L+1}, \ldots, x_{L+U}\}$. Here, y is the label for the labeled data. SVMs have a decision function $f_\theta(\cdot)$ of the form:

$$f_\theta(x) = \omega \cdot \Phi(x) + b,$$

where $\theta=(\omega,b)$ represents parameters of the hyperplane classifier that classifies the data, and $\Phi(x)$ is a feature map which maps real world data to a high dimensional feature space. SVMs and TSVMs can be used to classify any type of real world data into two classes. However, the real world data often cannot be classified with a linear hyperplane classifier, so the real world data is transformed to labeled training data and unlabeled test data in a high dimensional feature space. For example, in text classification, pieces of text are transformed into data points in a high dimensional feature space, so that a hyperplane classifier can be used to classify the data points corresponding to the text into two classes. Other examples of real word data that can be transformed into training data for classification include, but are not limited to, images (e.g., faces, objects, digits, etc.), sounds (speech, music signal, etc.), and biological components (proteins, types of cells, etc.). The transformation of data to the high dimensional feature space can be performed using a kernel function $k(x1,x2)=\Phi(x1)\cdot\Phi(x2)$, which defines implicitly the mapping into the higher dimensional feature space. The use of the kernel function to map data from a lower to a higher dimensionality is well known in the art, for example as described in V. Vapnik, *Statistical Learning Theory*, Wiley, New York, 1998.

Given the training set $\Lambda$ and the test set Y, the TSVM optimization problem attempts to find among the possible binary vectors $$\{Y=(y_{L+1}, \ldots, y_{L+U})\}$$

the one that an SVM trained on $\mathcal{L} \cup (\mathcal{U} \times Y)$ yields the largest margin. Accordingly, the TSVM optimization problem attempts to label each of the test set Y with the label that maximizes the margin.

The TSVM optimization problem is a combinatorial problem, but it can be approximated as finding an SVM separating the training set under constraints which force the unlabeled examples to be as far as possible from the margin. The can be expressed as minimizing:

$$\frac{1}{2}\|\omega\|^2 + C\sum_{i=1}^{L}\xi_i + C^*\sum_{i=L+1}^{L+U}\xi_i$$

subject to $$y_i f_\theta(x_i) \geq 1-\xi_i, i=1,\ldots,L$$

$$|f_\theta(x_i)| \geq 1-\xi_i, i=L+1,\ldots,L+U$$

where $\xi_i$ is the distance of a data point from the margin, C is the cost function for the labeled data, and C* is the cost function for the unlabeled data. The cost functions assign a cost or a penalty to the data points based on a location of the data point relative to the margin. This minimization problem is equivalent to minimizing:

$$J(\theta) = \frac{1}{2}\|\omega\|^2 + C\sum_{i=1}^{L} H_1(y_i f_\theta(x_i)) + C^* \sum_{i=L+1}^{L+U} H_1(|f_\theta(x_i)|), \quad (1)$$

where the function $H_1(\cdot) = \max(0, 1-\cdot)$ is a classical Hinge Loss function for the labeled data. This classical Hinge Loss function is shown in graph 704 of FIG. 7. A standard loss function $H_1(|\cdot|)$ for the unlabeled is shown in graph 602 of FIG. 6. For C*=0 in Equation (1), the standard SVM optimization problem can be obtained. For C*>0, unlabeled data within the margin is penalized based on the loss function for unlabeled data. This is equivalent to using the hinge loss on the labeled data, but with an assumption that the label for the unlabeled example is $y_i = \text{sign}(f_\theta(x_i))$.

Figure 6:
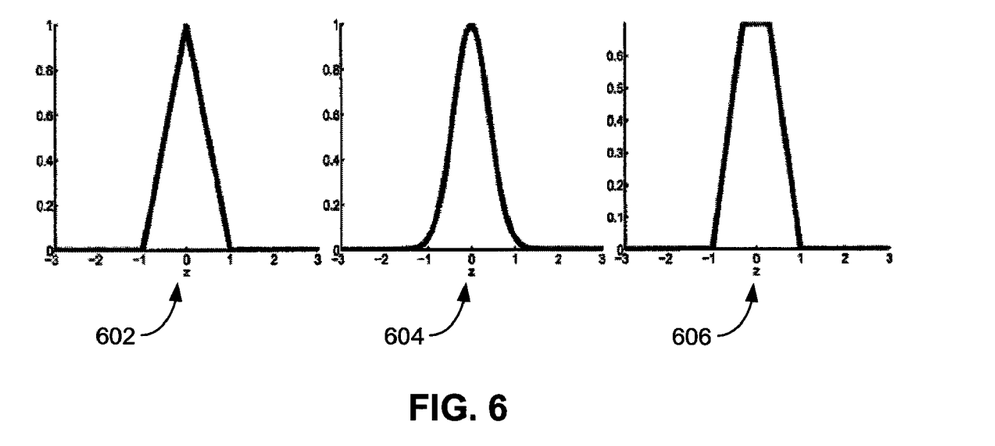
FIG. 6 illustrates three loss functions for unlabeled data.
Figure 7:
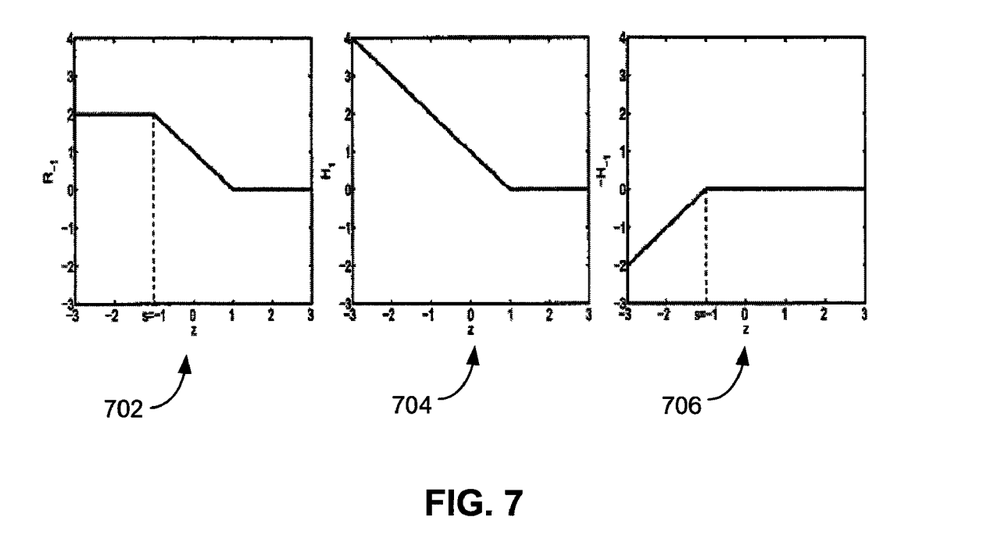
FIG. 7 illustrates a Ramp Loss function and the decomposition of the Ramp Loss function into convex and concave Hinge Loss functions.

FIG. 6 illustrates three loss functions for unlabeled data. Conventional TSVMs based on Equation (1) use the loss functions shown in graphs 602 and 604 for unlabeled data. For example, the SVMLight algorithm, described in T. Joachims, "Transductive Inference for Text Classification Using Support Vector Machines", *International Conference on Machine Learning*, ICML, 1999, assigns a Hinge Loss $H_1(\cdot)$ (see graph 704 of FIG. 7) on labeled examples and a "Symmetric Hinge Loss" $H_1(|\cdot|)$ (graph 602) on unlabeled data. The algorithm described in O. Chapelle and A. Zien, "Semi-Supervised Classification by Low Density Separation", *Proceedings of the Tenth International Workshop on Artificial Intelligence and Statistics*, 2005, uses a smooth version of the Symmetric Hinge Loss (graph 604) for the unlabeled data:

Graph 606 of FIG. 6 shows a loss function for unlabeled data in a TSVM according to an embodiment of the present invention. Given an unlabeled example x and using the notation $z = f_\theta(x)$, this loss function 606 can be expressed as:

$$z \mapsto R_s(z) + R_s(-z), \quad (2)$$

where s<1 is a hyper-parameter and $R_s$ refers to a "Ramp Loss" function, which is a "cut" version of the Hinge Loss function. FIG. 7 illustrates the Ramp Loss function $R_s$. The Ramp Loss function is shown in graph 702 of FIG. 7. The s parameter controls where the Ramp Loss function 702 is cut, and as a consequence this parameter also controls the wideness of the flat portion of the loss function (606 of FIG. 6) used for transduction according to an embodiment of the present invention. When s=0, the loss function reverts to the Symmetric Hinge $H_1(|\cdot|)$ shown in graph 602. When s≠0, a non-peaked loss function (graph 606) is generated. This non-peaked loss function 606 when s≠0 is referred to herein as the "Symmetric Ramp Loss" function.

As illustrated in FIG. 7, the Ramp Loss function 702 can be decomposed into the sum of the convex Hinge Loss function 704 and a concave loss function shown in graph 706. As described above, the Hinge Loss function 704 is used for the labeled data.

Training a TSVM using the Symmetric Ramp Loss function 606 expressed in Equation (2) is equivalent to training an SVM using the Hinge Loss function $H_1(\cdot)$ 704 for labeled examples, and using the Ramp Loss $R_s(\cdot)$ 702 for unlabeled examples, where each unlabeled example appears as two examples labeled with both possible classes. Accordingly, by introducing:

$y_i = 1\ i \in [L+1 \ldots L+U]$ $y_i = -1\ i \in [L+U+1 \ldots L+2U]$ $x_i = x_{i-U}\ i \in [L+U+1 \ldots L+2U],$ it is possible to rewrite Equation (1) as:

$$J^s(\theta) = \frac{1}{2}\|\omega\|^2 + C\sum_{i=1}^{L} H_1(y_i f_\theta(x_i)) + C^* \sum_{i=L+1}^{L+2U} R_s(y_i f_\theta(x_i)). \quad (3)$$

Accordingly, each of the unlabeled examples are duplicated in order to associate a cost with assigning each of the classes to the unlabeled examples. The minimization of the TSVM objective function expressed by Equation (3) will be considered hereinafter.

One problem with TSVMs is that in high dimensions with few training data it is possible to classify all of the unlabeled examples as belonging to only one of the classes with a very large margin. This can lead to poor performance of a TSVM. In response to this problem, it is possible to constrain the solution of the TSVM objective function by introducing a balancing constraint, which assures that data are assigned to both classes. The balancing constraint enforces that a fraction of positives and negatives assigned to the unlabeled data is the same fraction as found in the labeled data. An example of a possible balancing constraint can be expressed as:

$$\frac{1}{U}\sum_{i=L+1}^{L+U} f_\theta(x_i) = \frac{1}{L}\sum_{i=1}^{L} y_i. \quad (4)$$

The TSVM optimization problem as expressed in Equation (3) is not convex and minimizing a non-convex objective function can be very difficult. The "Concave-Convex Procedure" (CCCP) is a procedure for solving non-convex problems that can be expressed as the sum of a convex function and a convex function. The CCCP procedure is generally described in A. L. Yuille and A. Rangarajan, "The Concave-Convex Procedure (CCCP)", *Advances in Neural Information Processing Systems* 14, MIT Press, Cambridge, Mass., 2002. However, in order to apply the CCCP procedure to the TSVM optimization problem, it is necessary to express the objective function in terms of a convex function and a concave function, and to take into account the balancing constraint.

Figure 8A:
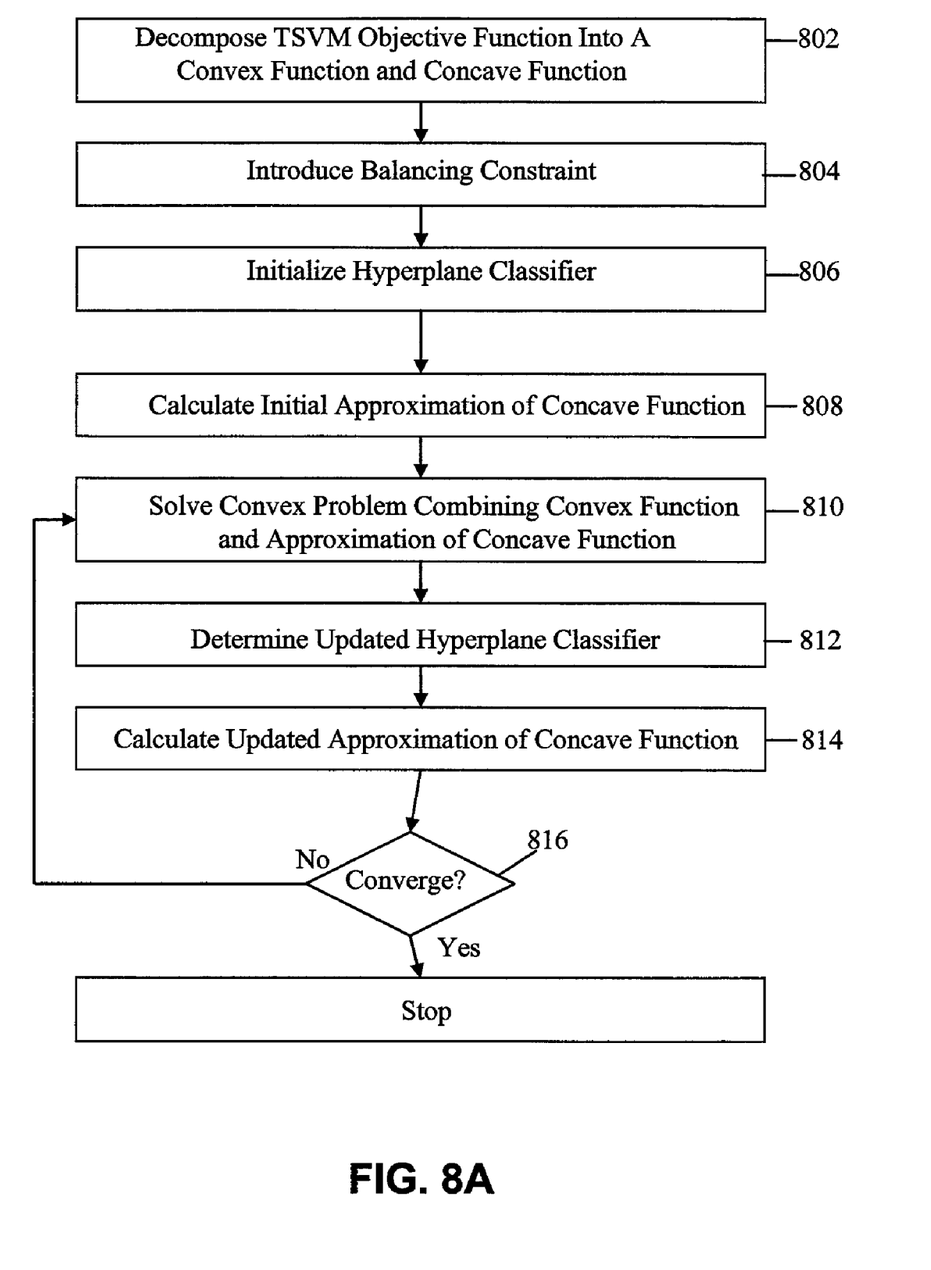
FIG. 8A illustrates a method for training a TSVM according to an embodiment of the present invention.
Figure 8B:
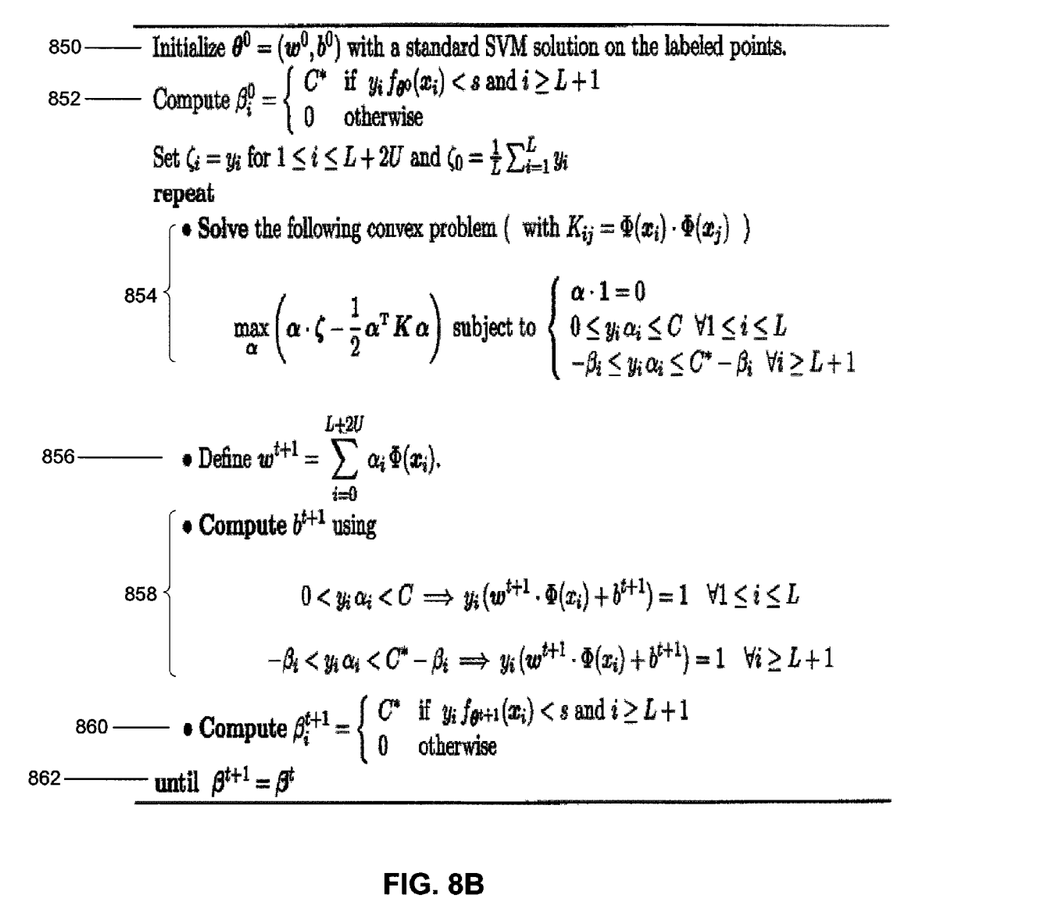
FIG. 8B is pseudo code of the method shown in FIG. 8A.

FIG. 8A illustrates a method for training the TSVM according to an embodiment of the present invention. This method is a method for optimizing the TSVM objective function in order to determine a hyperplane classifier that classifies all of the unlabeled data. FIG. 8B is pseudo code of the method of FIG. 8A. One skilled in the art will readily be able to associate portions of the pseudo code of FIG. 8B with the steps of FIG. 8A.

At step 802, the TSVM objective function is decomposed into a convex function and a concave function. A convex function is a function that always lies over its tangent, and a concave function is a function that always lies under its tangent. The TSVM objective function is expressed in Equation (3). As described above and illustrated in FIG. 7, the Ramp Loss (702) can be rewritten as the sum of two Hinge losses (704 and 706), such that:

$$R_s(z) = H_1(z) - H_s(z). \quad (5)$$

$H_1(z)$ is convex and $-H_s(z)$ is concave.

Based on the deconstruction of the Ramp Loss function for the unlabeled data, the TSVM objective function $J^s(\theta)$ can be decomposed into the sum of a convex function $J_{vex}^s(\theta)$ and a concave function $J_{cav}^s(\theta)$ as follows:

$$J^s(\theta) = \frac{1}{2}\|\omega\|^2 + C\sum_{i=1}^{L} H_1(y_i f_\theta(x_i)) + C^*\sum_{i=L+1}^{L+2U} R_s(y_i f_\theta(x_i)) \quad (6)$$

$$= \underbrace{\frac{1}{2}\|w\|^2 + C\sum_{i=1}^{L} H_1(y_i f_\theta(x_i)) + C^*\sum_{i=L+1}^{L+2U} H_1(y_i f_\theta(x_i))}_{J_{vex}^s(\theta)} - \underbrace{C^*\sum_{i=L+1}^{L+2U} H_s(y_i f_\theta(x_i))}_{J_{cav}^s(\theta)}.$$

The convex function $J_{vex}^s(\theta)$ of Equation (6) can be reformulated and expressed using dual variables $\alpha$ using the standard notation of SVM. The dual variables $\alpha$ are Lagrangian variables corresponding to the constraints of the SVM.

At step 804, the balancing constraint is introduced to the decomposed objective function for the CCCP procedure. Enforcing the balancing constraint of Equation (4) can be achieved by introducing an extra Lagrangian variable $\alpha_0$ and an example (or data point) $x_0$ explicitly defined by:

$$\Phi(x_0) = \frac{1}{U}\sum_{i=L}^{L+U} \Phi(x_i),$$

with label $y_0 = 1$. Thus, if we note K the kernel matrix such that $$K_{ij} = \Phi(x_i) \cdot \Phi(x_j),$$

the column corresponding to the example $x_0$ is calculated as follows:

$$K_{i0} = K_{0i} = \frac{1}{U}\sum_{j=L+1}^{L+U} \Phi(x_j) \cdot \Phi(x_i) \forall i. \quad (7)$$

the computation of this column can be efficiently achieved by calculating it one time, or by approximating Equation (7) using a know sampling method.

At step 806, a hyperplane classifier is initialized. As described above, a hyperplane classifier which classifies the data into two classes is defined in terms of $\theta = (\omega, b)$. An initial estimate for the hyperplane classifier can be determined using a SVM solution on only the labeled data points. This step is shown at 850 in the pseudo code of FIG. 8B.

At step 808, an initial approximation of the concave function is calculated. This initial approximation is a local approximation of the concave function at the initialized hyperplane classifier. For example, a tangent of the concave function $J_{cav}^s(\theta)$ at the initial hyperplane classifier $\theta^0$ can be used as an initial estimate of the concave function $J_{cav}^s(\theta)$. A first order approximation of the concave part $J_{cav}^s(\theta)$ of the TSVM objective function can be calculated as:

$$\beta_i = y_i \frac{\partial J_{cav}^s(\theta)}{\partial f_\theta(x_i)} = \begin{cases} C^* & \text{if } y_i f_\theta(x_i) < s \\ 0 & \text{otherwise} \end{cases}, \quad (8)$$

for unlabeled examples (i.e., $i \geq L+1$). The concave function $J_{cav}^s(\theta)$ does not depend on labeled examples ($i \leq L$), so $\beta_i = 0$ for all $i \leq L$. The initial approximation $B_i^0$ can be calculated Equation (8). This step is shown at 852 in the pseudo code of FIG. 8B.

At step 810, a convex problem combining the convex function $J_{vex}^s(\theta)$ of the TSVM objective function and approximation of the concave function at the current hyperplane is solved. The convex function $J_{vex}^s(\theta)$ is combined with the approximation of the concave function such that the resulting function remains convex. Since this resulting problem is convex, we can apply any efficient convex optimization algorithm. For example, the resulting function may be solved using a known SVM algorithm. Therefore, as in known algorithms used in SVMs, the primal minimization problem can be transformed into a dual maximization problem. This step is shown at 854 in the pseudo code of FIG. 8B.

At step 812, an updated hyperplane classifier is determined based on the solution to the convex problem. The parameters of the $(\omega, b)$ hyperplane classifier 6 are updated based on the solution to the convex problem of step 810. This step is shown at 856 and 858 in the pseudo code of FIG. 8B. At 856, $\omega$ is updated, and at 858, b is updated.

At step 814, an updated approximation for the concave function of the TSVM objective function is calculated based on the update hyperplane classifier. Using Equation (8), a first order local approximation (i.e., the tangent) of the concave function is calculated in at the updated hyperplane. This step is shown at 860 in the pseudo code of FIG. 8B.

At step 816, it is determined whether the solution has converged. It is possible to determine whether the solution has converged by comparing the updated approximation for the concave function ($\beta^{t+1}$) based on the updated hyperplane with the previous approximation for the concave function ($\beta^t$). If the updated approximation is equal to the previous approximation than the solution has converged. This step is shown at 862 in the pseudo code of FIG. 8B. If the solution has converged, the method stops and the updated hyperplane is the final solution. If the solution has not converged, the method repeats steps 812-816 until the method converges.

This method is guaranteed to converge to a solution in finite time because the variable $\beta$ can only take a finite number of values and because $J(\theta^t)$ decreases with every iteration. As described herein a CCCP-TSVM is used to classify data. Training a CCCP-TSVM amounts to solving a series of SVM optimization problems with L+2U variables. Although conventional SVM training has a worst case complexity of $O((L+2U)^3)$, it typically scales quadratically. The CCCP-TSVM method described above also scales quadratically similar to the conventional SVM training. This is faster than the conventional TSVM training methods.

Figure 9:
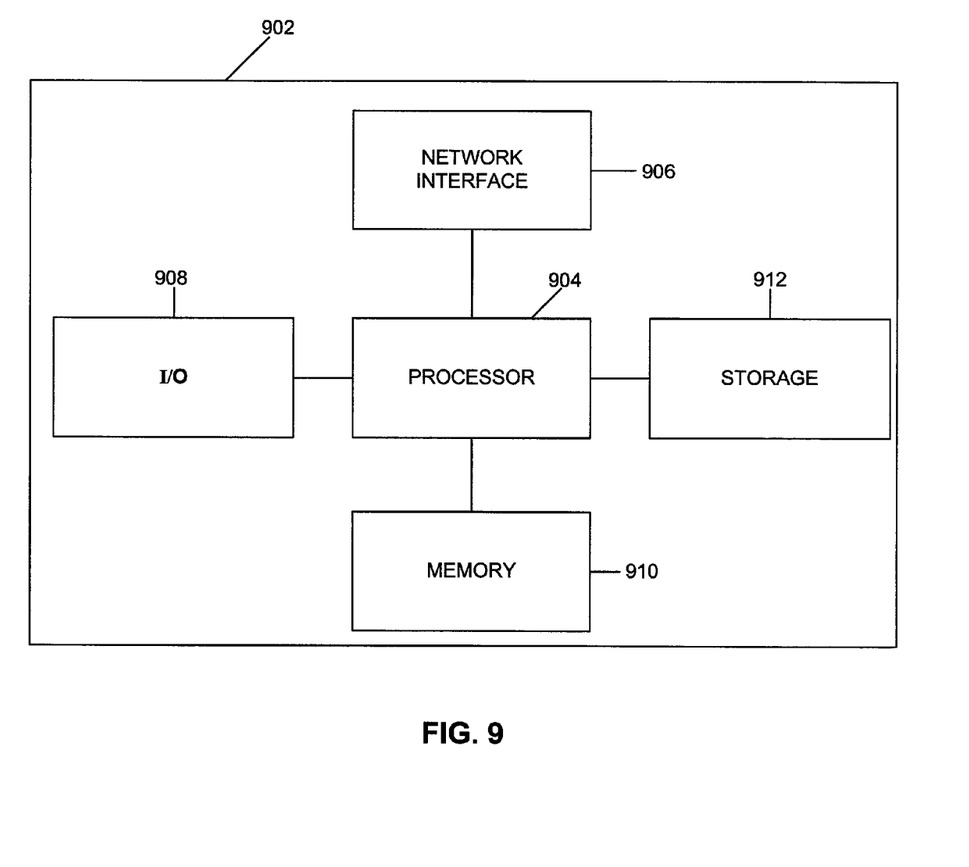
FIG. 9 shows a high level block diagram of a computer capable of implementing embodiments of the present invention.

The steps of the method described herein may be performed by computers containing processors which are executing computer program code which defines the functionality described herein. Such computers are well known in the art, and may be implemented, for example, using well known computer processors, memory units, storage devices, computer software, and other components. A high level block diagram of such a computer is shown in FIG. 9. Computer 902 contains a processor 904 which controls the overall operation of computer 902 by executing computer program instructions which define such operation. The computer program instructions may be stored in a storage device 912 (e.g., magnetic disk) and loaded into memory 910 when execution of the computer program instructions is desired. Thus, the operation of computer 902 is defined by computer program instructions stored in memory 910 and/or storage 910 and the computer 902 will be controlled by processor 904 executing the computer program instructions. Computer 902 also includes one or more network interfaces 906 for communicating with other devices via a network. Computer 902 also includes input/output 908 which represents devices which allow for user interaction with the computer 902 (e.g., display, keyboard, mouse, speakers, buttons, etc.). One skilled in the art will recognize that an implementation of an actual computer will contain other components as well, and that FIG. 9 is a high level representation of some of the components of such a computer for illustrative purposes. One skilled in the art will also recognize that the functionality described herein may be implemented using hardware, software, and various combinations of hardware and software.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

The invention claimed is:

1. A method for training a transductive support vector machine, based on a non-convex transductive support vector machine objective function, the transductive support vector machine objective function based on two ramp loss functions for unlabeled test data, the method comprising:
   decomposing each of the ramp loss functions into a difference of hinge losses, with a computer processor;
   using the differences of the hinge losses to decompose the transductive support vector machine objective function into a sum of a concave function and a convex function, with a computer processor; and
   determining a hyperplane classifier classifying the unlabeled data into first and second classes with a computer processor by iteratively approximating the concave function.

2. The method of claim 1, wherein said step of determining a hyperplane classifier comprises:
   (a) determining an initial hyperplane classifier;
   (b) calculating a local approximation of the concave function at the initial hyperplane classifier;
   (c) solving a convex problem formed by combining the local approximation to the concave function with the convex function;
   (d) determining an updated hyperplane classifier based on the solution to the convex problem;
   (e) calculating a local approximation of the concave function at the updated hyperplane classifier; and
   (f) repeating steps (c)-(e) until the local approximation of the concave function at the updated hyperplane classifier converges.

3. The method of claim 2, wherein step (a) comprises:
   determining the initial hyperplane classifier using a support vector machine based on the labeled data.

4. The method of claim 2, wherein each of steps (b) and (e) comprises:
   calculating a tangent of the concave function at a hyperplane classifier.

5. The method of claim 2, wherein said step of determining a hyperplane classifier further comprises:
   (g) enforcing a balancing constraint for balancing a ratio of the unlabeled data classified into the first and second classes and a ratio of the labeled data classified into the first and second classes.

6. The method of claim 1, wherein said loss function for the unlabeled data comprises a Symmetric Ramp Loss function achieved by duplicating all of the unlabeled data in order to associate a cost with classifying all of the unlabeled data into both of the first and second classes.

7. The method of claim 1, further comprising:
   mapping data into a high dimensional feature space with a computer processor, to generate the labeled training data and the unlabeled test data.

8. The method of claim 7, further comprising:
   classifying the real world data with a computer processor, using the hyperplane classifier.

9. A computer readable medium storing computer program instructions for training a transductive support vector machine based on a non-convex transductive support vector machine objective function, the transductive support vector machine objective function based on two ramp loss functions for unlabeled test data, said computer program instructions defining the steps comprising:
   decomposing each of the ramp loss functions into a difference of hinge losses;
   using the differences of the hinge losses to decompose the transductive support vector machine objective function into a sum of a concave function and a convex function; and
   determining a hyperplane classifier classifying the unlabeled data into first and second classes by iteratively approximating the concave function.

10. The computer readable medium of claim 9, wherein the computer program instructions defining the step of determining a hyperplane classifier comprise: computer program instructions defining the steps of:
   (a) determining an initial hyperplane classifier;
   (b) calculating a local approximation of the concave function at the initial hyperplane classifier;
   (c) solving a convex problem formed by combining the local approximation to the concave function with the convex function;
   (d) determining an updated hyperplane classifier based on the solution to the convex problem;
   (e) calculating a local approximation of the concave function at the updated hyperplane classifier; and
   (f) repeating steps (c)-(e) until the local approximation of the concave function at the updated hyperplane classifier converges.

11. The computer readable medium of claim 10, wherein the computer program instructions defining step (a) comprise computer program instructions defining the step of:
   determining the initial hyperplane classifier using a support vector machine based on the labeled data.

12. The computer readable medium of claim 10, wherein the computer program instructions defining each of steps (b) and (e) comprise computer program instructions defining the step of:

calculating a tangent of the concave function at a hyperplane classifier.

13. The computer readable medium of claim 10, wherein the computer program instructions defining the step of determining a hyperplane classifier further comprise computer program instructions defining the step of:

(g) enforcing a balancing constraint for balancing a ratio of the unlabeled data classified into the first and second classes and a ratio of the labeled data classified into the first and second classes.

14. The computer readable medium of claim 9, wherein said loss function for the unlabeled data comprises a Symmetric Ramp Loss function achieved by duplicating all of the unlabeled data in order to associate a cost with classifying all of the unlabeled data into both of the first and second classes.

15. The computer readable medium of claim 9, further comprising computer program instructions defining the step of:

mapping data into a high dimensional feature space to generate the labeled training data and the unlabeled test data.

16. The computer readable medium of claim 15, further comprising computer program instructions defining the step of:

classifying the real world data using the hyperplane classifier.

17. An apparatus for training a transductive support vector machine based on a non-convex transductive support vector machine objective function, the transductive support vector machine objective function based on two ramp loss functions for unlabeled test data, the apparatus comprising: a processor executing instructions for:

decomposing the ramp loss function into a difference of hinge losses;

using the differences of the hinge losses to decompose the transductive support vector machine objective function into a sum of a concave function and a convex function; and determining a hyperplane classifier classifying the unlabeled data into first and second classes by iteratively approximating the concave function.

18. The apparatus of claim 17, wherein said instructions for determining a hyperplane classifier comprises instructions for:

initializing parameters of a hyperplane classifier;

calculating a local approximation of the concave function based on the parameters of the hyperplane classifier;

solving a convex problem formed by combining the local approximation to the concave function with the convex function; and updating the parameters of the hyperplane classifier based on the solution to the convex problem.

19. The apparatus of claim 18, wherein said instructions for determining a hyperplane classifier further comprises instructions for:

determining when the parameters of the hyperplane classifier converge.

20. The apparatus of claim 18, wherein said instructions for initializing parameters of a hyperplane classifier comprises instructions for:

determining the parameters of the hyperplane classifier using a support vector machine based on the labeled data.

21. The apparatus of claim 18, wherein said instructions for calculating a local approximation of the concave function comprises instructions for:

calculating a tangent of the concave function at the parameters of the hyperplane classifier.

22. The apparatus of claim 18, wherein said instructions for determining a hyperplane classifier further comprises instructions for:

enforcing a balancing constraint for balancing a ratio of the unlabeled data classified into the first and second classes and a ratio of the labeled data classified into the first and second classes.

23. The apparatus of claim 17, wherein said loss function for the unlabeled data comprises a Symmetric Ramp Loss function achieved by duplicating all of the unlabeled data in order to associate a cost with classifying all of the unlabeled data into both of the first and second classes.

24. The apparatus of claim 17, further comprising instructions for:

mapping data into a high dimensional feature space to generate the labeled training data and the unlabeled test data.

25. The apparatus of claim 24, further comprising instructions for:

classifying the real world data using the hyperplane classifier.

* * * * *